US012651505B2

(12) United States Patent
Thoeni et al.

(10) Patent No.: US 12,651,505 B2
(45) **Date of Patent: *Jun. 9, 2026**

(54) LOTTERY TICKET VENDING MACHINE

(71) Applicant: Brightstar Global Solutions Corporation, Providence, RI (US)

(72) Inventors: Stewart Thoeni, Reno, NV (US); Paul A. Bucci, Glocester, RI (US); Thomas Quaranta, North Kingstown, RI (US); Wayne Forsey, Riverview (CA)

(73) Assignee: Brightstar Global Solutions Corporation, Providence, RI (US)

(*) Notice: Subject to any disclaimer, the term of this patent is extended or adjusted under 35 U.S.C. 154(b) by 302 days.

This patent is subject to a terminal disclaimer.

(21) Appl. No.: 18/492,299

(22) Filed: Oct. 23, 2023

(65) Prior Publication Data

US 2025/0131787 A1 Apr. 24, 2025

(51) Int. Cl.

| | |
|---|---|
| ***G07F 11/04*** | (2006.01) |
| ***G07F 17/00*** | (2006.01) |
| ***G07F 17/32*** | (2006.01) |

(52) U.S. Cl.

CPC ........ *G07F 11/045* (2013.01); *G07F 17/0035* (2013.01); *G07F 17/329* (2013.01)

(58) Field of Classification Search

CPC ... G07F 11/045; G07F 17/0035; G07F 17/329

See application file for complete search history.

(56) References Cited

U.S. PATENT DOCUMENTS

| | | | |
|---|---|---|---|
| 3,855,457 | A | 12/1974 | Amundson et al. |
| 4,350,264 | A | 9/1982 | Muller |
| 4,982,337 | A | 1/1991 | Burr et al. |
| 5,222,624 | A | 6/1993 | Burr |
| 5,268,561 | A | 12/1993 | Kimura et al. |
| 5,272,321 | A | 12/1993 | Otsuka et al. |
| 5,408,417 | A | 4/1995 | Wilder |
| 5,836,498 | A | 11/1998 | Turek |

(Continued)

FOREIGN PATENT DOCUMENTS

| | | |
|---|---|---|
| CA | 2379687 C | 11/2005 |
| IT | 20090162 A1 | 3/2011 |

(Continued)

OTHER PUBLICATIONS

"Extended European Search Report", from corresponding European Patent Application No. EP24206365.9, Nov. 15, 2024.

*Primary Examiner* — Werner G Garner

(57) ABSTRACT

A lottery ticket vending machine configured to determine if its ticket bursters are improperly separating the lottery tickets received from the ticket drawers of the ticket drawer columns, and to make one or more adjustments and/or alert an operator if its ticket bursters are improperly separating the lottery tickets. In various embodiments, each of the tickets bursters includes a suitable burster mark former configured to create a burster mark in or on each lottery ticket received by the burster and a suitable burster mark sensor configured to sense at least one burster mark of each lottery ticket received by such burster. In various embodiments, the lottery ticket vending machine includes one or more controllers configured to receive signals from the burster mark sensor and make such determinations regarding any adjustments and/or alerts, and to cause any such adjustments and/or alerts.

20 Claims, 15 Drawing Sheets

(56) References Cited

U.S. PATENT DOCUMENTS

| | | | |
|---|---|---|---|
| 6,095,624 | A | 8/2000 | Wilbert |
| 6,206,263 | B1 | 3/2001 | Rich et al. |
| 6,609,644 | B1 | 8/2003 | Menna |
| 6,637,634 | B1 | 10/2003 | Yeo et al. |
| 6,712,253 | B2 | 3/2004 | Hargrave et al. |
| 6,714,838 | B2 | 3/2004 | Scrymgeour et al. |
| 6,726,077 | B2 | 4/2004 | Roberts et al. |
| 6,886,728 | B2 | 5/2005 | Roberts et al. |
| 6,994,230 | B2 | 2/2006 | Sams |
| 7,032,774 | B2 | 4/2006 | Boehm et al. |
| 7,383,099 | B2 | 6/2008 | Pollard et al. |
| 7,562,798 | B2 | 7/2009 | Bartolone et al. |
| 7,665,394 | B2 | 2/2010 | Roberts et al. |
| 7,850,257 | B2 | 12/2010 | Roberts et al. |
| 8,127,973 | B2 | 3/2012 | Mirkovic et al. |
| 8,192,268 | B1 | 6/2012 | Karpe |
| 8,210,921 | B1 | 7/2012 | Karpe |
| 8,534,524 | B2 | 9/2013 | Businger et al. |
| 8,550,294 | B2 | 10/2013 | Martin |
| 9,613,337 | B1 | 4/2017 | Garrison |
| 9,685,026 | B1 | 6/2017 | Garrison |
| 10,438,452 | B2 | 10/2019 | Ferron et al. |
| 11,010,987 | B2 | 5/2021 | Bucci |
| 12,080,132 | B2 | 9/2024 | Topalian et al. |
| 2001/0049986 | A1 | 12/2001 | Roberts et al. |
| 2003/0120381 | A1 | 6/2003 | Perin et al. |
| 2003/0204288 | A1 | 10/2003 | Scrymgeour et al. |
| 2004/0000572 | A1 | 1/2004 | Engelhardt, Jr. et al. |
| 2004/0254008 | A1 | 12/2004 | Anderson et al. |
| 2005/0178810 | A1 | 8/2005 | Woods et al. |
| 2006/0173576 | A1 | 8/2006 | Goerg et al. |
| 2007/0017978 | A1 | 1/2007 | Ho |
| 2007/0088459 | A1 | 4/2007 | Pollard et al. |
| 2007/0172106 | A1 | 7/2007 | Paraskevakos |
| 2008/0290127 | A1 | 11/2008 | Bartolone et al. |
| 2010/0308071 | A1 | 12/2010 | Businger |
| 2011/0042403 | A1 | 2/2011 | Martin |
| 2012/0085777 | A1 | 4/2012 | Bucci et al. |
| 2014/0008407 | A1 | 1/2014 | Bucci et al. |
| 2014/0117614 | A1 | 5/2014 | Kallin et al. |
| 2014/0263619 | A1 | 9/2014 | Turocy et al. |
| 2014/0353375 | A1 | 12/2014 | Turocy et al. |
| 2015/0066207 | A1 | 3/2015 | Erb |
| 2016/0232741 | A1 | 8/2016 | Assis et al. |
| 2017/0004671 | A1 | 1/2017 | Connolly et al. |
| 2018/0108203 | A1 | 4/2018 | Li et al. |
| 2018/0186557 | A1 | 7/2018 | Ghia et al. |
| 2018/0186558 | A1 | 7/2018 | Mejenborg et al. |
| 2020/0023265 | A1 | 1/2020 | Kennedy |
| 2022/0108562 | A1 | 4/2022 | Claude et al. |
| 2022/0114842 | A1 | 4/2022 | Mejenborg et al. |
| 2022/0114860 | A1 | 4/2022 | Mejenborg et al. |
| 2023/0084907 | A1 | 3/2023 | Gonzalez et al. |
| 2024/0021054 | A1 | 1/2024 | Topalian et al. |
| 2025/0118127 | A1 | 4/2025 | Thoeni et al. |
| 2025/0166445 | A1 | 5/2025 | Topalian et al. |

FOREIGN PATENT DOCUMENTS

| | | | |
|---|---|---|---|
| JP | H11306413 | A | 11/1999 |
| KR | 0139213 | Y1 | 4/1999 |
| KR | 0175637 | B1 | 4/1999 |
| WO | 2004099915 | A2 | 11/2004 |

LOTTERY TICKET VENDING MACHINE

CROSS-REFERENCE TO RELATED APPLICATIONS

This application is related to the following commonly owned patent applications: U.S. application Ser. No. 18/480,167, entitled: "LOTTERY TICKET VENDING MACHINE"; U.S. application Ser. No. 18/480,136, entitled "LOTTERY TICKET VENDING MACHINE"; U.S. application Ser. No. 18/481,521, entitled: "LOTTERY TICKET VENDING MACHINE"; and U.S. application Ser. No. 18/423,871, entitled: "LOTTERY TICKET VENDING MACHINE".

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; a ticket drawer column in the housing, the ticket drawer column including a plurality of ticket drawers, each of the ticket drawers configured to hold a strip of lottery tickets; a ticket burster in the housing, the ticket burster: (a) defining a ticket inlet and a ticket outlet, (b) movable to a plurality of different ticket receipt positions, each different ticket receipt position associated with and in alignment with a different one of the ticket drawers, (c) including a burster-mark former configured to form a burster mark in the lottery ticket that moves through the ticket burster, and (d) including a burster mark sensor supported by the ticket burster and configured to create signals based on the burster mark in the lottery ticket; and a controller configured to receive signals created by the burster mark sensor, determine if the lottery ticket is improperly positioned based on the signals, and cause a corrective action to be taken responsive to determining that the lottery ticket is improperly positioned.

In various other embodiments, the present disclosure relates to a lottery ticket vending machine including: a housing; a ticket drawer column in the housing, the ticket drawer column including a plurality of ticket drawers, each of the ticket drawers configured to hold a strip of lottery tickets; a ticket burster in the housing, the ticket burster: (a) defining a ticket inlet and a ticket outlet, (b) movable to a plurality of different ticket receipt positions, each different ticket receipt position associated with and in alignment with a different one of the ticket drawers, (c) including a burster-mark former configured to form a burster mark on the lottery ticket that moves through the ticket burster, and (d) including a burster mark sensor supported by the ticket burster and configured to create signals based on the burster mark on the lottery ticket; and a controller configured to receive signals created by the burster mark sensor, determine if the lottery ticket is improperly positioned based on the signals, and cause a corrective action to be taken responsive to determining that the lottery ticket is improperly positioned.

In various other embodiments, the present disclosure relates to a lottery ticket vending machine including: a housing; a lottery ticket drawer supported by the housing; a ticket burster supported by the housing and including a burster mark former and a burster mark sensor; and a controller supported by the housing, the controller configured to operate with the burster mark former to form a burster mark in or on a lottery ticket and to operate with the burster mark sensor to determine if the lottery ticket is fed in to the ticket burster in a proper position to enable the ticket burster to properly separate lottery ticket received from the ticket drawer based on the burster mark, and to cause a corrective action to be taken responsive to determining that the ticket burster is improperly separating the lottery tickets.

Additional features are described in, and will be apparent from, the following Detailed Description and the figures.

DETAILED DESCRIPTION

Figure 1:
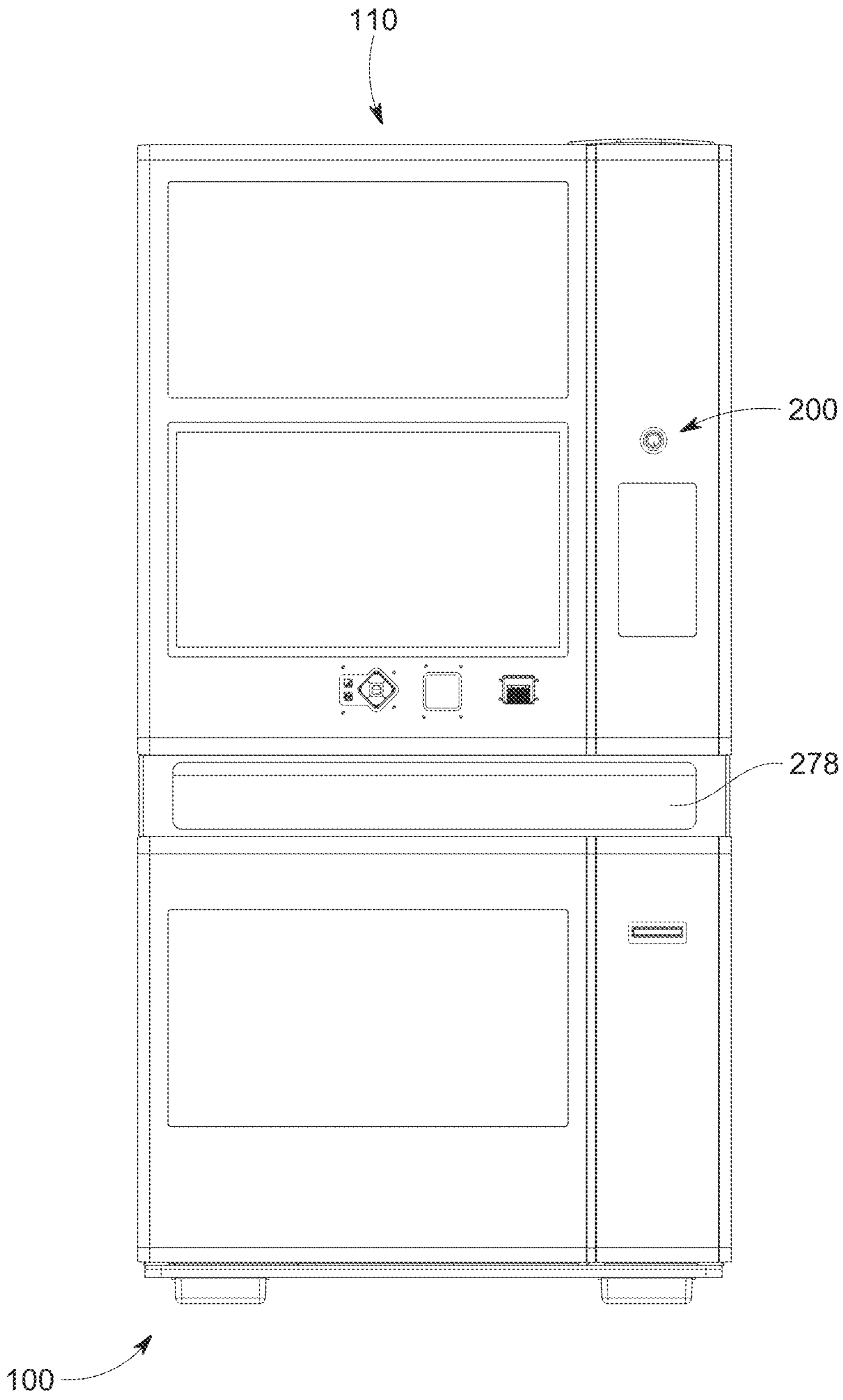
FIG. 1 is a front perspective view of a lottery ticket vending machine of one example embodiment of the present disclosure shown with a front door thereof in a closed position.

In various embodiments, the present disclosure relates to a lottery ticket vending machine that includes one or more ticket bursters and one or more ticket drawers, and that is configured to: (1) determine if any of the lottery tickets received by the ticket bursters from the ticket drawers are improperly positioned (in a manner that can cause the ticket bursters to improperly separate the lottery tickets); and (2) in response to such determination, to make one or more adjustments and/or alert an operator of the improper positioning of any such the lottery tickets.

In various embodiments, each of the ticket bursters of the lottery ticket vending machine includes one or more burster mark formers configured to create one or more burster marks in or on each lottery ticket received in such ticket burster.

In various embodiments, each of the ticket bursters of the lottery ticket vending machine includes one or more burster mark sensors configured to sense one or more burster marks of each lottery ticket received in such ticket burster.

In various embodiments, the lottery ticket vending machine includes one or more controllers configured to receive signals from the burster mark sensor(s), analyze such signals with respect to comparison data, and make determinations regarding lottery ticket positions and any needed adjustments and/or alerts, and to cause any such determined needed adjustments and/or alerts to be made.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Various known instant lottery tickets have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or ticket retailers, and validation. Instant lottery ticket packs can include a plurality of lottery tickets (that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets attached to each other but joined by perforations. Such lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to dispensing via a lottery ticket vending machine.

Lottery ticket vending machines can include various components such as but not limited to pinch rollers, stepper motors, and cutting blades for dispensing lottery tickets. An issue that can arise with these components is miscut lottery tickets. For example, a miscut can occur when a lottery ticket is improperly indexed or registered from one perforation connecting adjacent lottery tickets in a pack of lottery tickets to the next lottery ticket in that pack. When the registration starts to erode, cuts at the perforations adjacent to the perforation can compound the registration problem.

More specifically, when a ticket burster receives a lottery ticket, the ticket burster can properly or improperly separate the lottery ticket from the next lottery ticket (of a pack in a lottery ticket drawer). The reasons that such an improper separation can occur include, but are not limited to: (1) a misalignment of the lottery tickets in the ticket drawer that leads to a misalignment of the lottery tickets as they are fed into the ticket burster; (2) a misalignment of the ticket burster relative to the ticket drawer that feeds the lottery tickets into the ticket burster; (3) misaligned or mis-registered feeding of the lottery ticket by the lottery ticket engagers (such as the driven rollers) of the ticket burster that move and guide the lottery ticket in the ticket burster; (4) slippage between the lottery ticket and the lottery ticket engagers (such as the driven rollers) of the ticket burster; (5) changes to such as shrinkage of the lottery ticket engagers (such as the driven rubber rollers) of the ticket burster; (6) unclean or imprecise previous separations such as cuts for previous lottery tickets in the lottery ticket strip; (7) deformations or extra pieces attached to the leading edges of lottery tickets from previously attached lottery tickets; (8) improperly formed perforations connecting adjacent lottery tickets in a pack; and (9) unintentional indentations or cut-outs in the leading edges of the lottery tickets. Such issues can in certain instances become progressively worst as these issues propagate along a lottery ticket strip. In certain instances, such issues can cause an important part of a lottery ticket to be missing-which in turn can cause a winning lottery ticket to be invalid or not redeemable due to such missing part.

To address these issues, various embodiments of the present disclosure provide a lottery ticket vending machine that includes a burster configured to cause one or more burster marks to be formed in or on each lottery ticket received in a burster. The present disclosure further contemplates detecting the burster mark(s) of each lottery ticket for determining any ticket positioning issues and for addressing such ticket positioning issues. In various embodiments, the lottery ticket vending machine uses one or more burster mark sensors (such as described below) to determine if each lottery ticket received in a burster is in a correct position for separation of that lottery ticket from the next lottery ticket in the strip of lottery tickets. The vending machine is configured to take one or more corrective actions (such as adjusting one or more components of the vending machine or the positions thereof) to address determined lottery ticket positioning issue(s), and/or is configured to provide one or more alerts to an operator of the vending machine that enables the operator to fix the cause of such determined lottery ticket positioning issue(s). It should be appreciated that these actions including the alerts can be suitably tracked and stored (such as by the controller of the lottery ticket vending machine or a remote system) for future reference and use.

Turning now to FIGS. 1, 2, 3, 4, 5, 6, and 7, a lottery ticket vending machine of one example embodiment of the present disclosure is generally illustrated and indicated by numeral 100. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic w holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form or a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the dispensing of each requested lottery ticket and the determination of any position issues of the lottery tickets (as further described below). The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
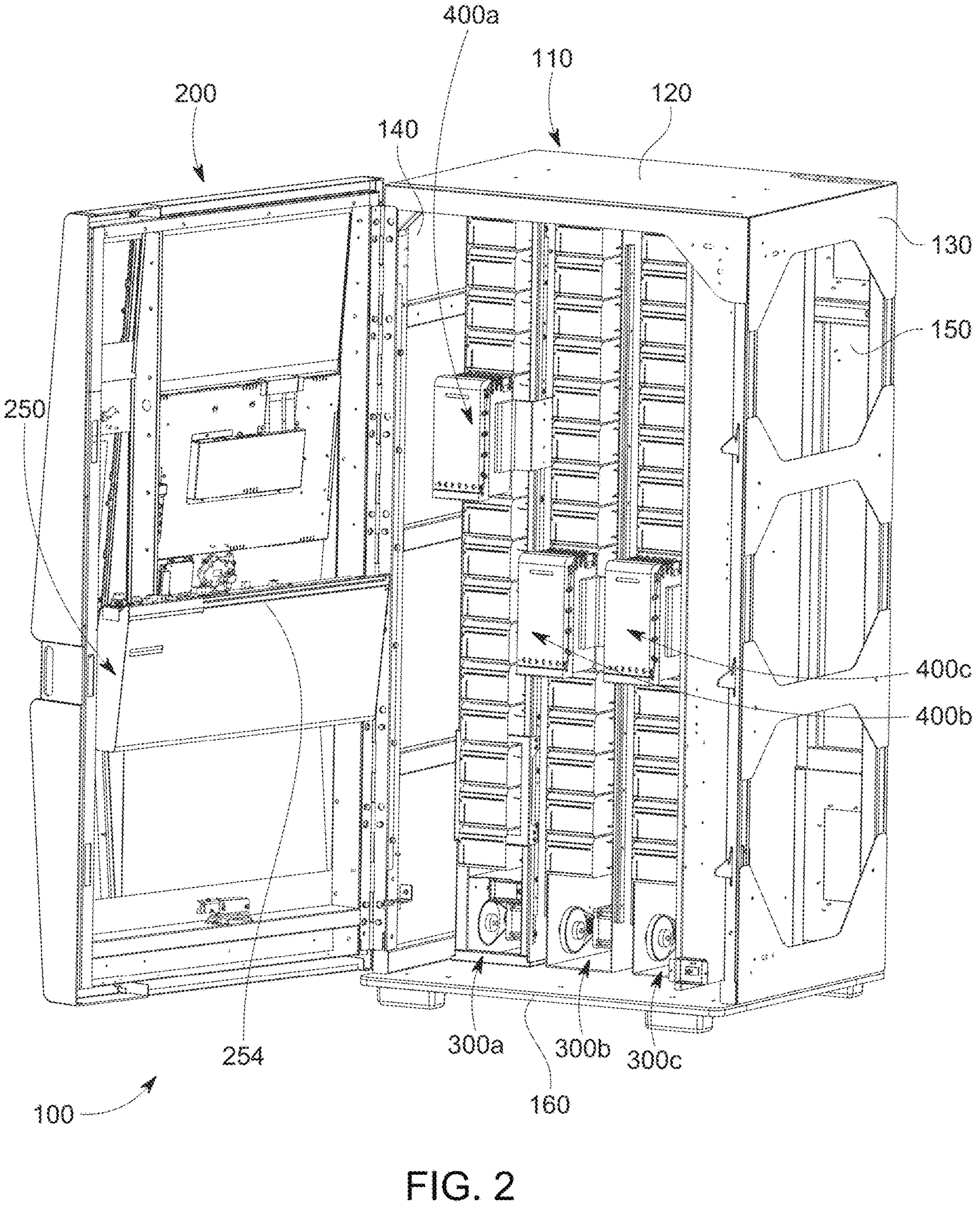
FIG. 2 is a front perspective view of the lottery ticket vending machine of FIG. 1 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 3:
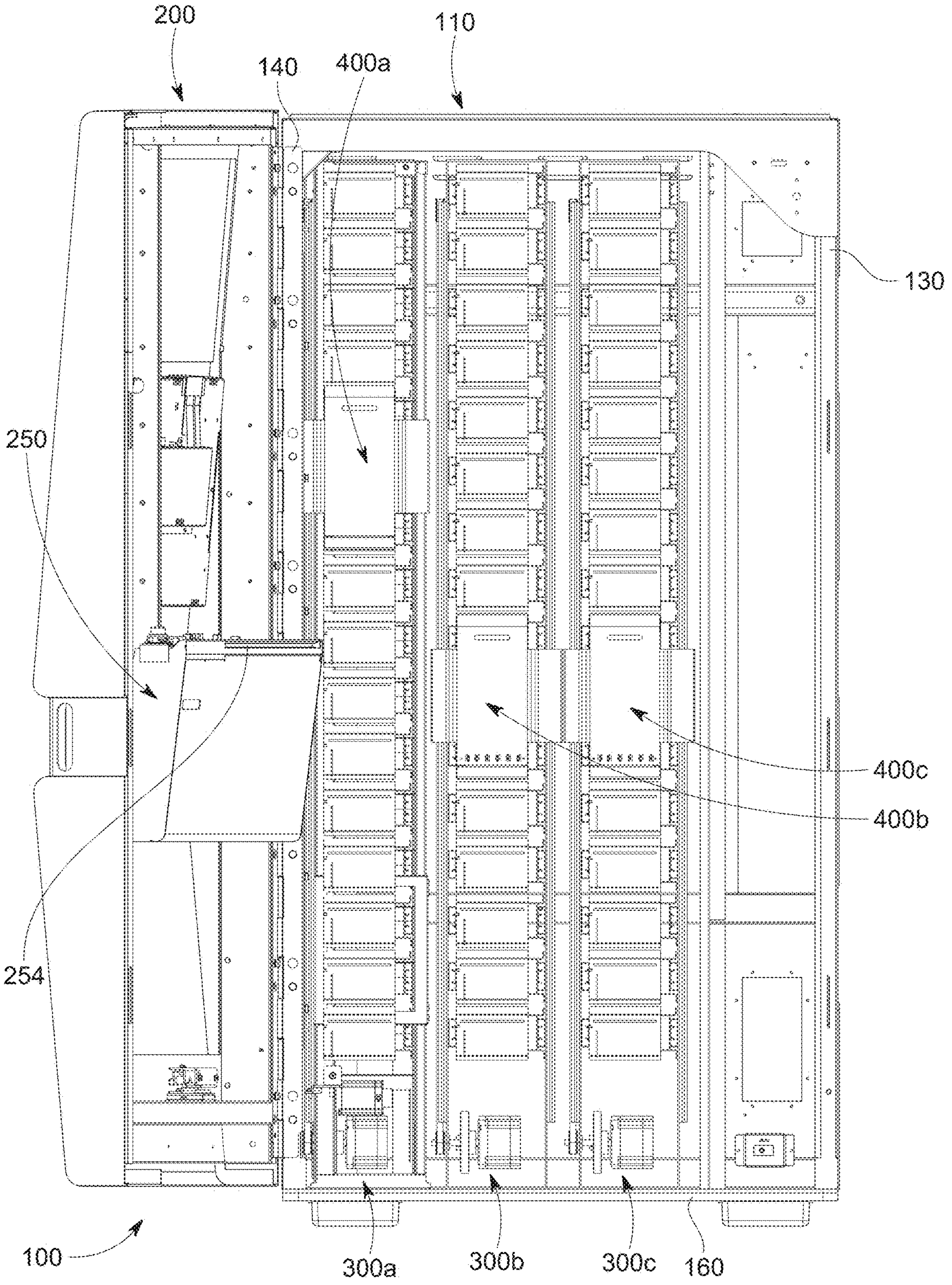
FIG. 3 is a front view of the lottery ticket vending machine of FIG. 1 shown with the front door thereof in the open position, shown with the left side wall panel thereof removed, showing the three ticket drawer columns and the three movable ticket bursters respectively associated the three ticket drawer columns, and showing the ticket collection receptacle of the front door.
Figure 4:
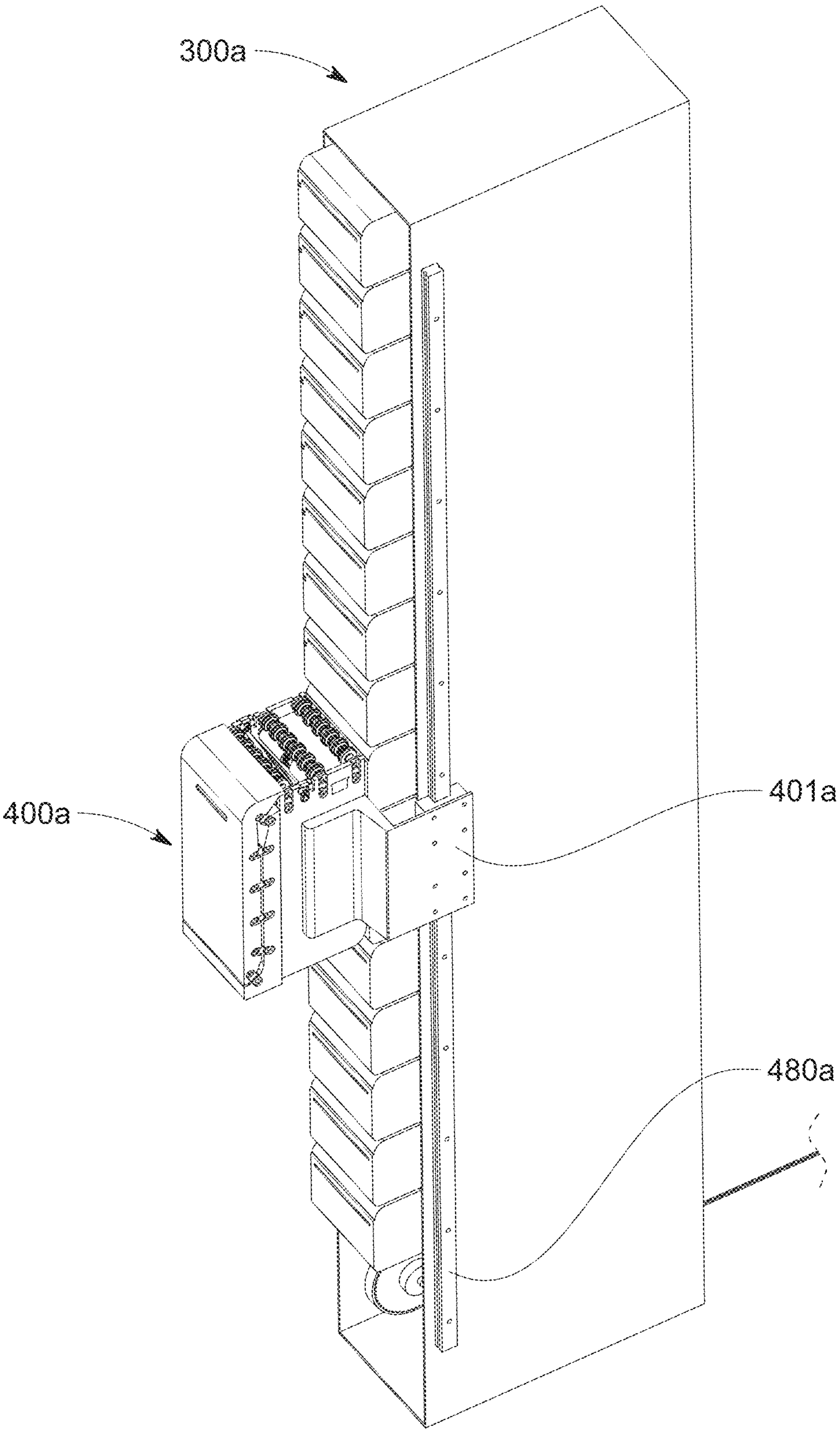
FIG. 4 is an enlarged fragmentary perspective view of one of the ticket drawer columns and the ticket burster associated with that ticket drawer column of the lottery ticket vending machine of FIG. 1 shown removed from the lottery ticket vending machine.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 as shown in FIG. 1 to an open position allowing access to the interior of the machine housing 110 as shown in FIGS. 2 and 3. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components. The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 2 and 3). The ticket collection receptacle 250 and the front door define an elongated horizontally extending purchase ticket retrieval slot 278 (best seen in FIG. 1). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300*a*, 300*b*, or 300*c*. The position, size, and configuration of the ticket collection receptacle can vary in accordance with the present disclosure.

Each of the ticket drawer columns 300*a*, 300*b*, and 300*c* are identical in this example embodiment. For brevity, only ticket drawer column 300*a* is described in detail herein. Likewise, the three movable ticket bursters 400*a*, 400*b*, and 400*c* are identical in this example embodiment. For brevity, only ticket burster 400*a* associated with the ticket drawer column 300*a* is described herein.

Ticket drawer column 300*a* includes a series of aligned ticket drawers (not individually labeled) that are vertically stacked in the column. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. Each ticket drawer is configured to hold lottery tickets such as instant lottery tickets for selection by the purchasers. In various embodiments, the different ticket drawers can hold different lottery ticket packs for different lottery games, but it should be appreciated, that two or more ticket drawers can hold the same type of lottery tickets. In various embodiments, each of the ticket drawers is configured to feed each instant lottery ticket held by that ticket drawer into the associated ticket burster 400*a* when the ticket burster 400*a* is moved into alignment with such ticket drawer for receipt, bursting, and dispensing of that lottery ticket. This ticket movement can be caused by an actuation lever of the burster engaging a ticket movement assembly of the ticket drawer, or in another suitable manner. Bursting of the lottery ticket is the industry term for separating a lottery ticket from a pack of lottery tickets held in a ticket drawer. In this example embodiment, the ticket drawers do not burst the lottery tickets and do not need any mechanisms for bursting the lottery tickets, but rather the moveable ticket burster 400*a* bursts the lottery tickets fed by the ticket drawers in the ticket drawer column 300*a* into that ticket burster 400*a*.

As shown in FIGS. 2, 3, 4, and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer column 300*a*. Each of the burster supporters also support the ticket burster 400*a* in a manner that enables the ticket burster 400*a* to vertically move to into alignment with the ticket receptacle 250.

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical locations including a plurality of the locations respectively associated and aligned with each of the ticket drawers of the ticket drawer column 300*a* such that the ticket burster 400*a* is positioned to receive one or more of the lottery tickets stored in each respective ticket drawer of the ticket drawer column 300*a* for obtaining and dispensing that instant lottery ticket into the ticket receptacle 400 for the purchaser as requested by the purchaser.

Figure 5:
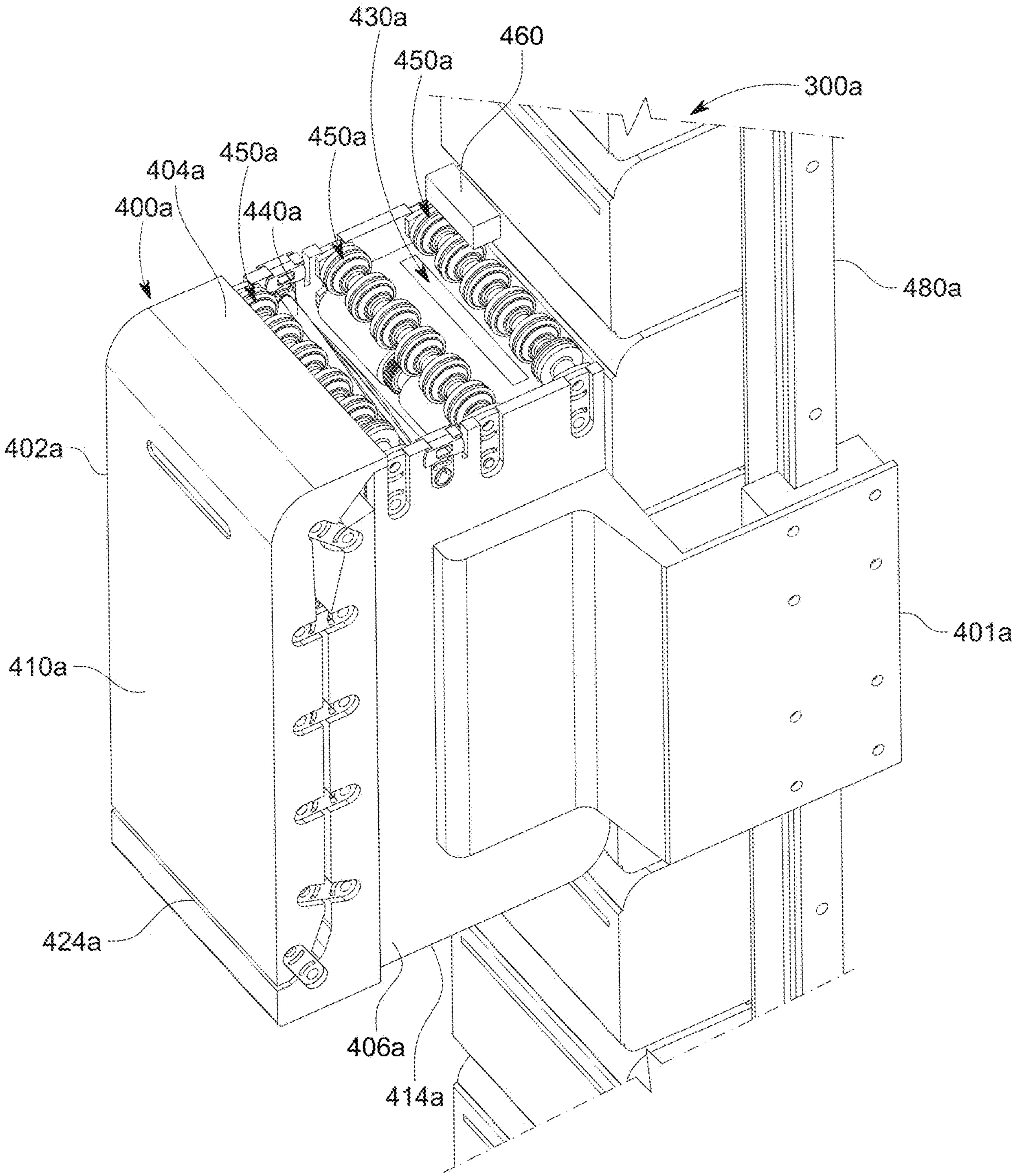
FIG. 5 is an enlarged fragmentary perspective view of the ticket drawer column and the ticket burster of FIG. 4, showing the one burster mark former of the ticket burster and a burster mark sensor of the ticket burster in accordance with one example embodiment of the present disclosure.
Figure 6:
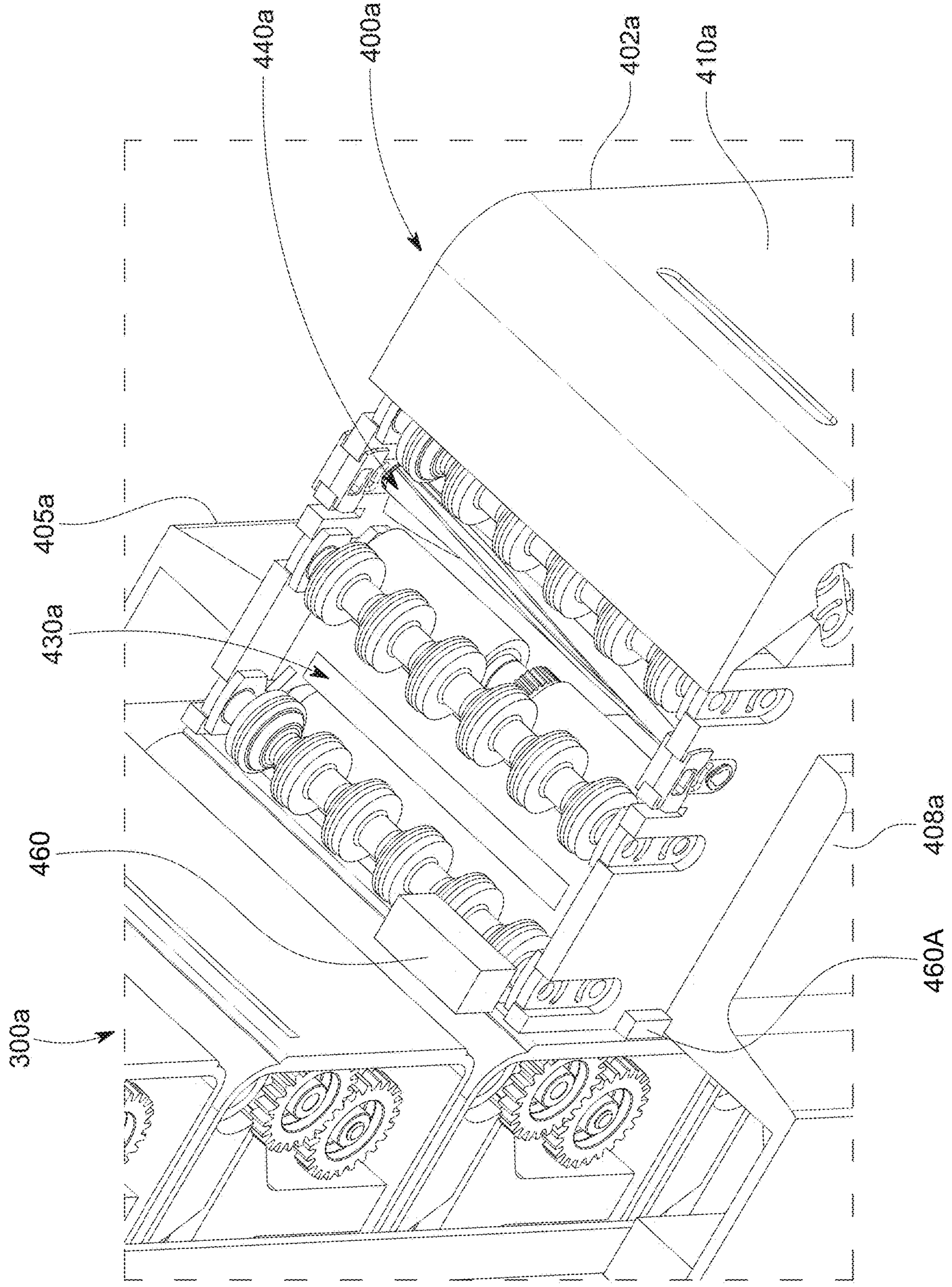
FIG. 6 is another enlarged fragmentary perspective view of the ticket drawer column and the ticket burster of FIG. 4 showing two burster mark formers of the ticket burster and a burster mark sensor of the ticket burster in accordance with one example embodiment of the present disclosure.
Figure 7:
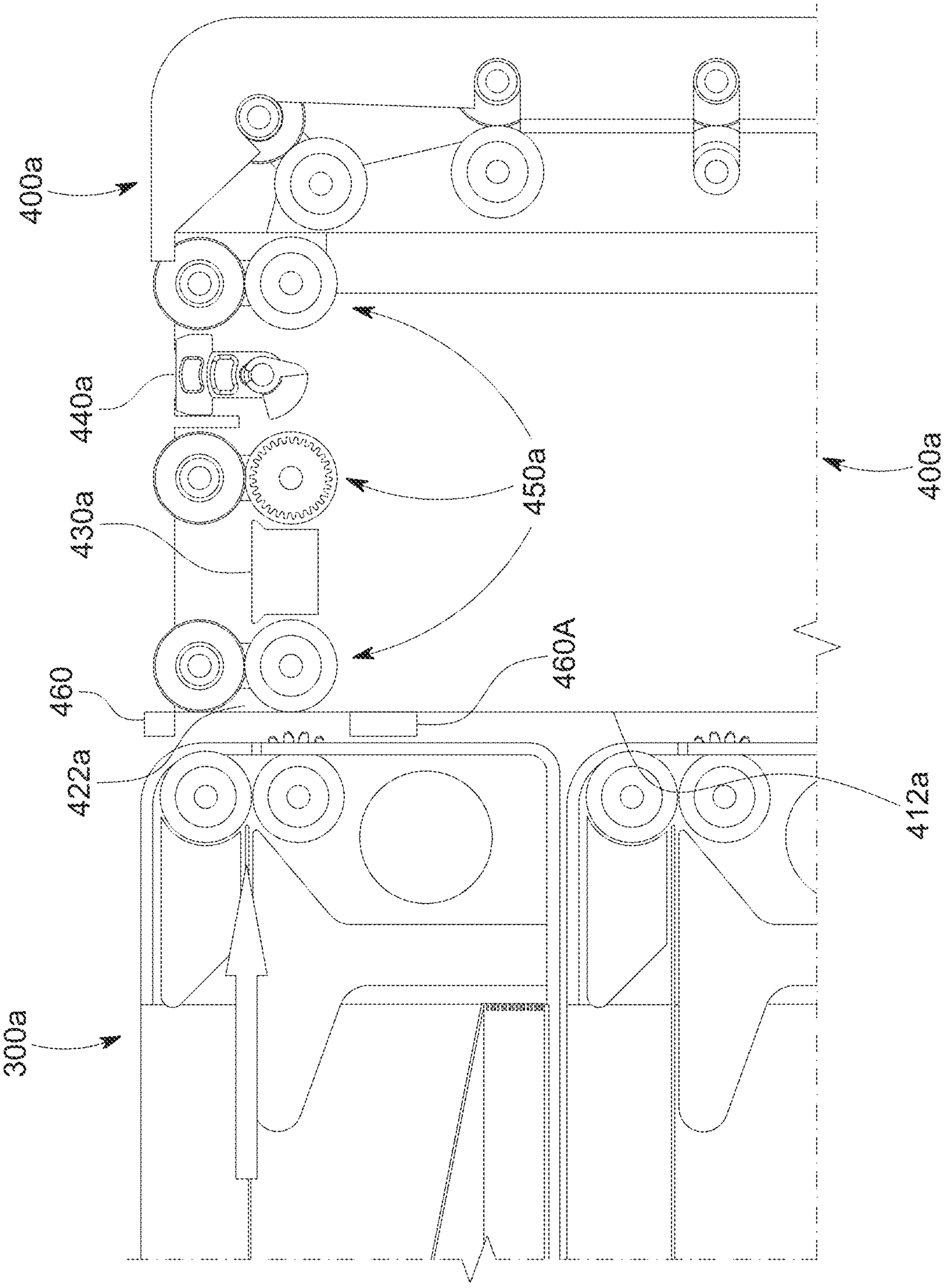
FIG. 7 is an enlarged fragmentary side view of the ticket drawer column and the ticket burster of FIG. 4 showing two burster mark formers of the ticket burster and a burster mark sensor of the ticket burster in accordance with one example embodiment of the present disclosure.

As best shown in FIGS. 5, 6, and 7, the example movable ticket burster 400*a* generally includes: (a) a burster housing 402*a*; (b) one or more burster supporter connecters (such as burster support connector 401*a* connecting the burster housing 402*a* and the burster supporter 480*a*); (c) one or more busters mark sensors such as burster mark sensor 430*a* in and supported by the burster housing 402*a*; (d) a ticket cutter 440*a* in and supported by the burster housing 402*a*; (e) a plurality of ticket engagers 450*a* supported by the burster housing 402*a*; (f) one or more burster mark formers such as burster mark formers 460 and 460*a* supported by the housing 402*a*; and (g) a burster controller (not shown). The size and configuration of the ticket burster can vary in accordance with the present disclosure.

More specifically, the burster housing 402*a* generally includes a top member 404*a*, spaced-apart side members (not labeled), a front member 410*a*, a rear member 412*a*, and a bottom member 414*a*. The burster housing 402*a* also includes a plurality of internal members (not individually labeled) that define a ticket inlet 422*a*, through which the ticket burster 400*a* is configured to receive a lottery ticket from a ticket drawer of the ticket drawer column 300*a*, a ticket outlet 424*a* through which the ticket burster 400*a* is configured to dispense the received instant lottery ticket into the ticket collection receptacle 250, and a ticket movement path (not labeled) extending from the ticket inlet 422*a* to the ticket outlet 424*a* and through which the lottery ticket is moved through the ticket burster 400*a*.

The ticket cutter 440*a* is positioned in the burster housing 402*a* and configured to rotate to cut the perforations attaching each lottery ticket that moves along the ticket movement path in the ticket burster 400*a* to the next lottery ticket of the continuous strip of lottery tickets received from the respective ticket drawer. The ticket cutter 440*a* is configured to make such cut along the perforations between the two connected lottery tickets of such strip. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the lottery ticket requested by the purchaser from the respective ticket drawer, the ticket drawer can retract the portion of the next lottery ticket (of the strip of lottery tickets) from the ticket burster 400*a* before the ticket burster 400*a* moves from the ticket receipt position aligned with that ticket drawer. This ticket movement can be caused by an actuation lever of the burster engaging a ticket movement assembly of the ticket drawer, or in another suitable manner. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next instant lottery ticket in the strip or may only need to withdraw the next instant lottery ticket in the strip a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each lottery ticket along the perforations connecting that lottery ticket to the next lottery ticket in the strip. In such embodiments, the ticket drawer may not need to withdraw the next lottery ticket of the strip or may only need to withdraw the next lottery ticket of the strip a relatively small distance. In such embodiments, the ticket burster may not need a ticket cutter.

It should be appreciated that the ticket burster 400*a* is thus configured to burst the perforations between the lottery ticket being dispensed and the next lottery ticket of the strip so as to enable the dispensed lottery ticket to be dispensed into the ticket receptacle 250. This prevents a person from improperly tearing a lottery ticket or being able to pull an extended number of lottery tickets from one of the ticket packs in one of the ticket drawers. It should be appreciated that the ticket burster 400*a* can be moved to a dispensing location for each lottery ticket dispensed, or for only certain of the lottery tickets dispensed. It should also be appreciated that the ticket burster can moved to a different location for any lottery ticket that is deemed to be bad or non-dispensable for any reason, and to deposit that ticket into a suitable rejection area.

The ticket engagers 450*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a*, the burster mark formers 460 and/or 460*a*, and the burster mark sensor 430*a* (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, burster mark former(s), and the burster mark sensor(s).

As indicated above, the ticket burster 400*a* includes one or more burster mark sensors such as burster mark sensor 430*a* that is positioned in and supported by the housing 402*a* of the ticket burster 400*a*. The burster mark sensor 430*a* extends transversely along the entire or substantially the entire width of the ticket burster 400*a* such that it can sense the one or more burster marks in or on each lottery ticket that moves through the ticket burster 400*a* as that lottery ticket moves above the burster mark sensor 430*a*. In this example embodiment, the burster mark sensor 430*a* is below the ticket movement path and thus scans upwardly toward the lottery ticket. In other alternative embodiments that are not shown, the burster mark sensor can be above the ticket movement path and thus scan downwardly toward the lottery ticket. In alternative embodiments, the ticket burster 400*a* can include two or more burster mark sensors.

As indicated above, the ticket burster 400*a* includes one or more burster mark formers such as burster mark formers 460 or 460*a* that are each supported by the housing 402*a* of the ticket burster 400*a*. The burster mark formers 460 and 460*a* are supported by the housing 402*a* of the ticket burster 400*a* such that they can each form one or more burster marks in or on each lottery ticket that moves through the ticket burster 400*a* as that lottery ticket moves above or below the respective burster mark former 460 or 460*a* (such as further described below). The burster mark formers 460 and 460*a* are controlled by the controller of the burster and/or the controller of the vending machine 100. In this example embodiment, the burster mark former 460 is above the ticket movement path and thus configured to create a burster mark on or in the lottery ticket from above the lottery ticket. In this example embodiment, the burster mark former 460*a* is below the ticket movement path and thus configured to create a burster mark on or in the lottery ticket from below the lottery ticket. In other alternative embodiments that are not shown, one or more of the burster mark formers can be in another suitable position relative to the ticket movement path and thus form a burster mark on or in the lottery ticket from that other position.

In various embodiments, one or more of the burster mark formers 460 and 460*a* of the ticket burster 400*a* form(s) one or more burster marks on the lottery ticket wherein each of the burster marks is printed on the substrate of the lottery ticket and can be subsequently scanned and thus sensed. Examples of such burster marks are shown in FIGS. 8 and 9.

Figure 8:
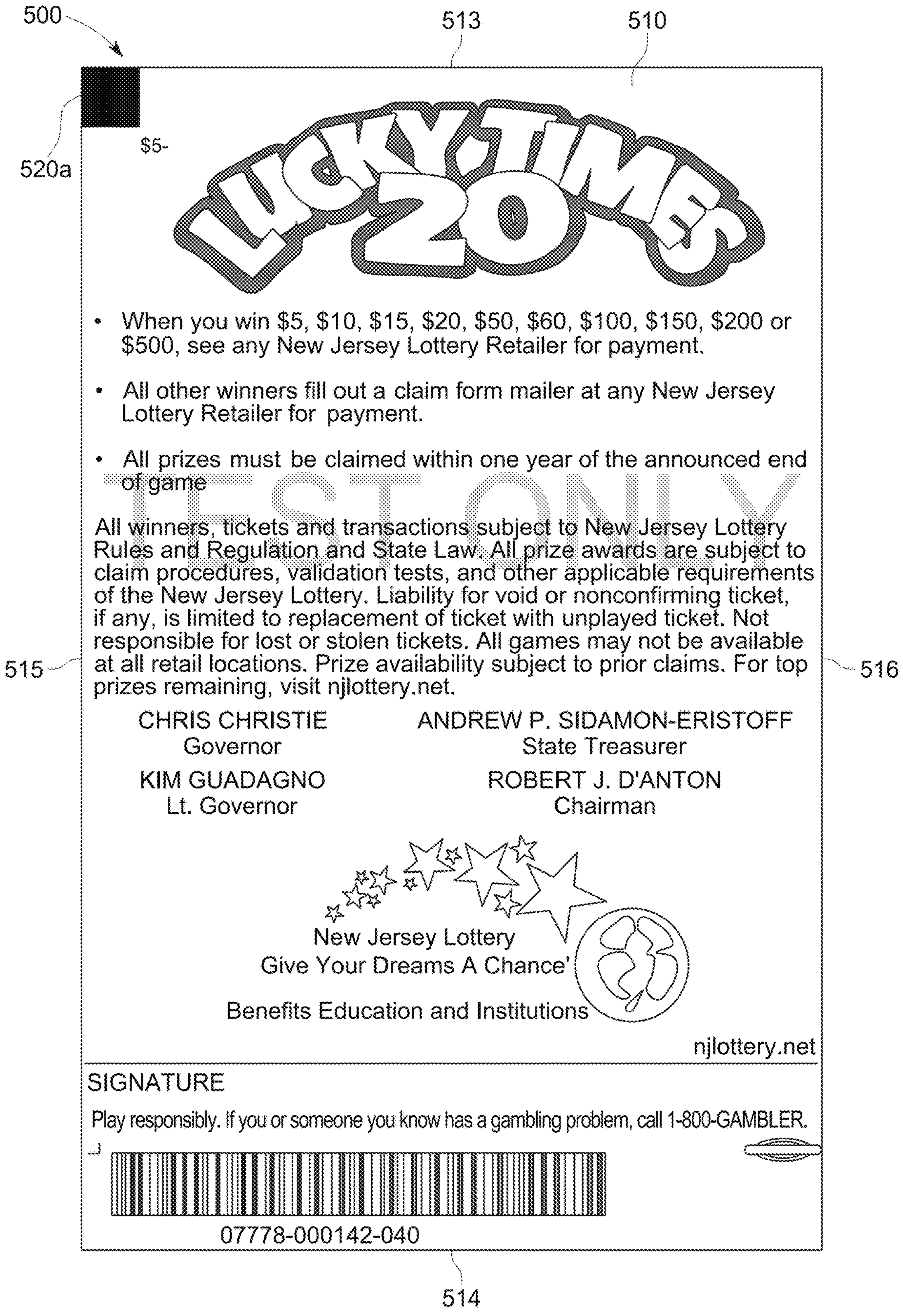
FIG. 8 is an image of the back side of a first example lottery ticket having a first example burster mark in accordance with the present disclosure.

More specifically, FIG. 8 shows the back surface 510 of the example lottery ticket 500 that includes a single burster mark 520*a*. The burster mark 520*a* includes: (1) upper and lower edges (not labeled) that are parallel to the end edges 513 and 514 of the lottery ticket 500 and perpendicular to the side edges 515 and 516 of the lottery ticket 500; and (2) a side edge (not labeled) that is perpendicular to the end edges 513 and 514 of the lottery ticket 500 and parallel to the side edges 515 and 516 of the lottery ticket 500. The burster mark 520*a*-which can be formed on one or more or every lottery ticket that that moved into the burster 400*a*-provides a series of crisp white to black transitions that can be sensed by the burster mark sensor 430*a* of the burster 400*a* to enable the controller(s) to determine if that lottery ticket is correctly positioned relative to the burster mark sensor 430*a* and thus the burster 400*a*.

It should be appreciated that if the lottery ticket enters the burster 400*a* in an improper position, the burster mark 520*a* would not include: (1) respective upper and lower edges that are parallel to the end edges 513 and 514 of the lottery ticket 500 and perpendicular to the side edges 515 and 516 of the lottery ticket 500; and/or (2) respective side edges that are perpendicular to the end edges 513 and 514 of the lottery ticket 500 and parallel to the side edges 515 and 516 of the lottery ticket 500. The burster sensor 430*a* would subsequently be able to detect that this burster mark 520*a* is in an improper position that would indicate the improper position of the lottery ticket in the burster.

Figure 9:
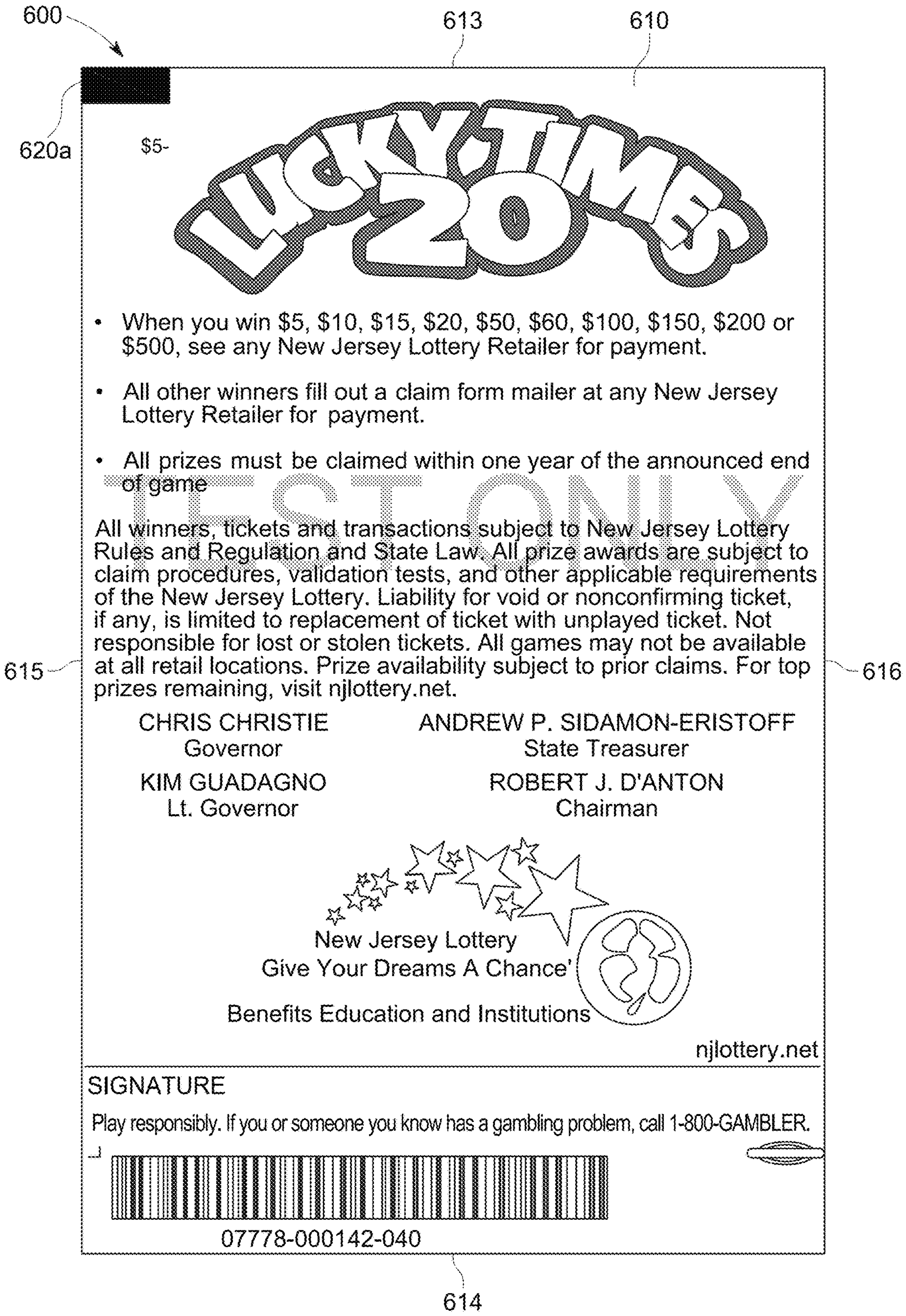
FIG. 9 is an image of the back side of a second example lottery ticket having a second example burster mark in accordance with the present disclosure.

In another example shown in FIG. 9, the back surface 610 of the example lottery ticket 600 includes a differently formed burster mark 620*a* having a different length and a different width than burster mark 520*a*. The burster mark 620*a* includes: (1) respective upper and lower edges (not labeled) that are parallel to the end edges 613 and 614 of the lottery ticket 600 and perpendicular to the side edges 615 and 616 of the lottery ticket 600; and (2) respective side edges (not labeled) that are perpendicular to the end edges 613 and 614 of the lottery ticket 600 and parallel to the side edges 615 and 616 of the lottery ticket 600. The burster mark 620*a*-which can be formed on one or more or every lottery ticket that that moved into the burster 400*a*-provides a series of crisp white to black transitions that can be sensed by the burster mark sensor 430*a* of the burster 400*a* to enable the controller(s) to determine if that lottery ticket is correctly positioned relative to the burster mark sensor 430*a* and thus the burster 400*a*.

It should be appreciated that if the lottery ticket enters the burster 400*a* in an improper position, the burster mark 620*a* would not include: (1) respective upper and lower edges that are parallel to the end edges 613 and 614 of the lottery ticket 600 and perpendicular to the side edges 615 and 616 of the lottery ticket 600; and/or (2) respective side edges that are perpendicular to the end edges 613 and 614 of the lottery ticket 600 and parallel to the side edges 615 and 616 of the lottery ticket 600. The burster sensor 430*a* would subsequently be able to detect that this burster mark 620*a* is in an improper position that would indicate the improper position of the lottery ticket in the burster.

In other examples that are not shown, the back surface of the example lottery ticket includes more than two burster marks that have the same dimensions. In other examples that are not shown, the back surface of the example lottery ticket includes more than two burster marks that have different dimensions. In other examples that are not shown, the back surface of the example lottery ticket includes one or more burster marks in different positions. It should thus be appreciated that the burster mark former(s) can create any suitable one or more burster marks printed on the lottery ticket in accordance with the present disclosure.

In the examples of FIGS. 8 and 9, since the burster marks are on the back side of the lottery tickets and the lottery tickets move in the burster 400*a* face up, the burster mark former 460*a* forms such as by printing the burster marks 520*a* or 620*a* on the lottery tickets. In such example embodiments, the burster mark former 460 would not be needed.

Figure 10:
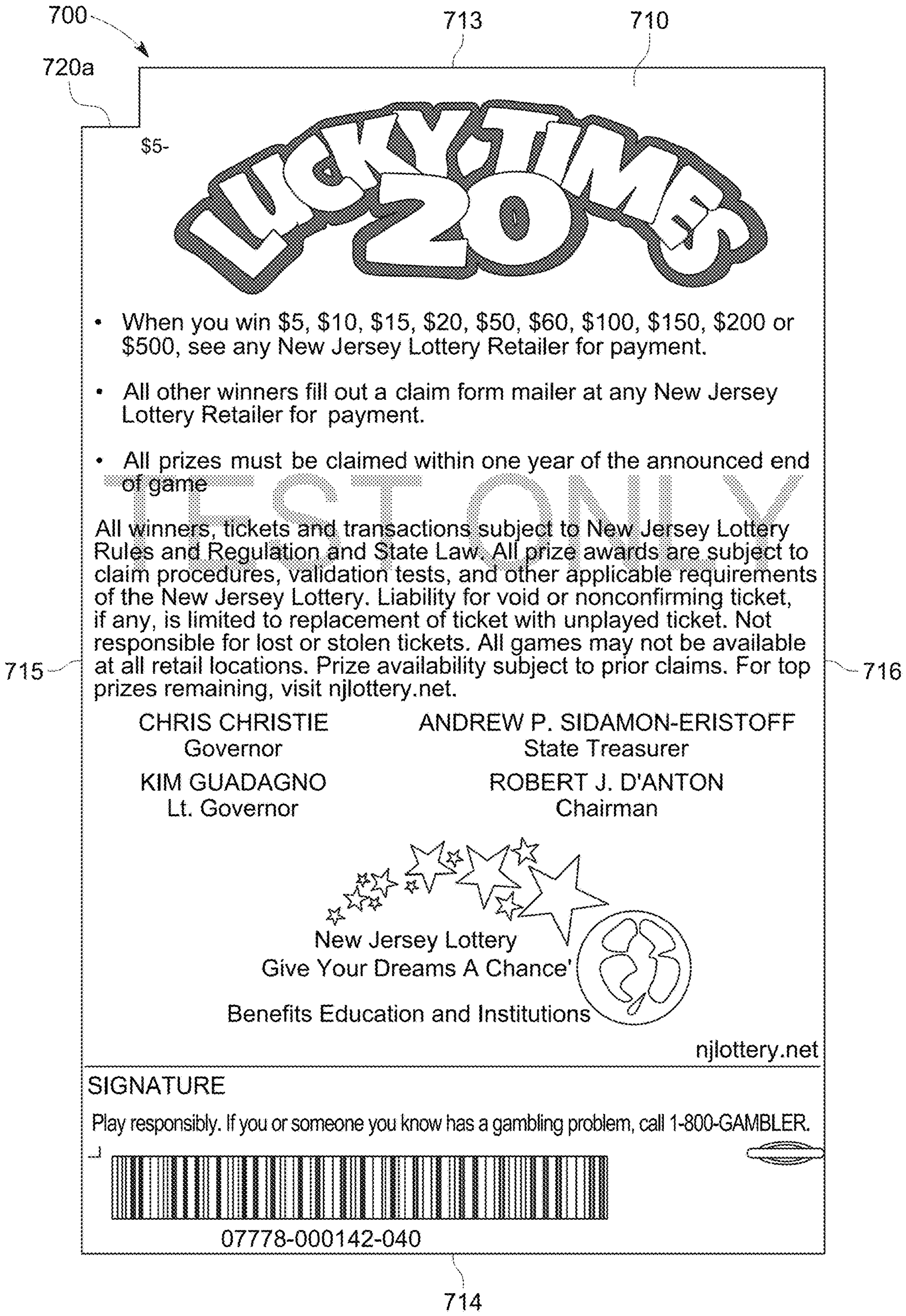
FIG. 10 is an image of the back side of a third example lottery ticket having a third example burster mark in accordance with the present disclosure.
Figure 11:
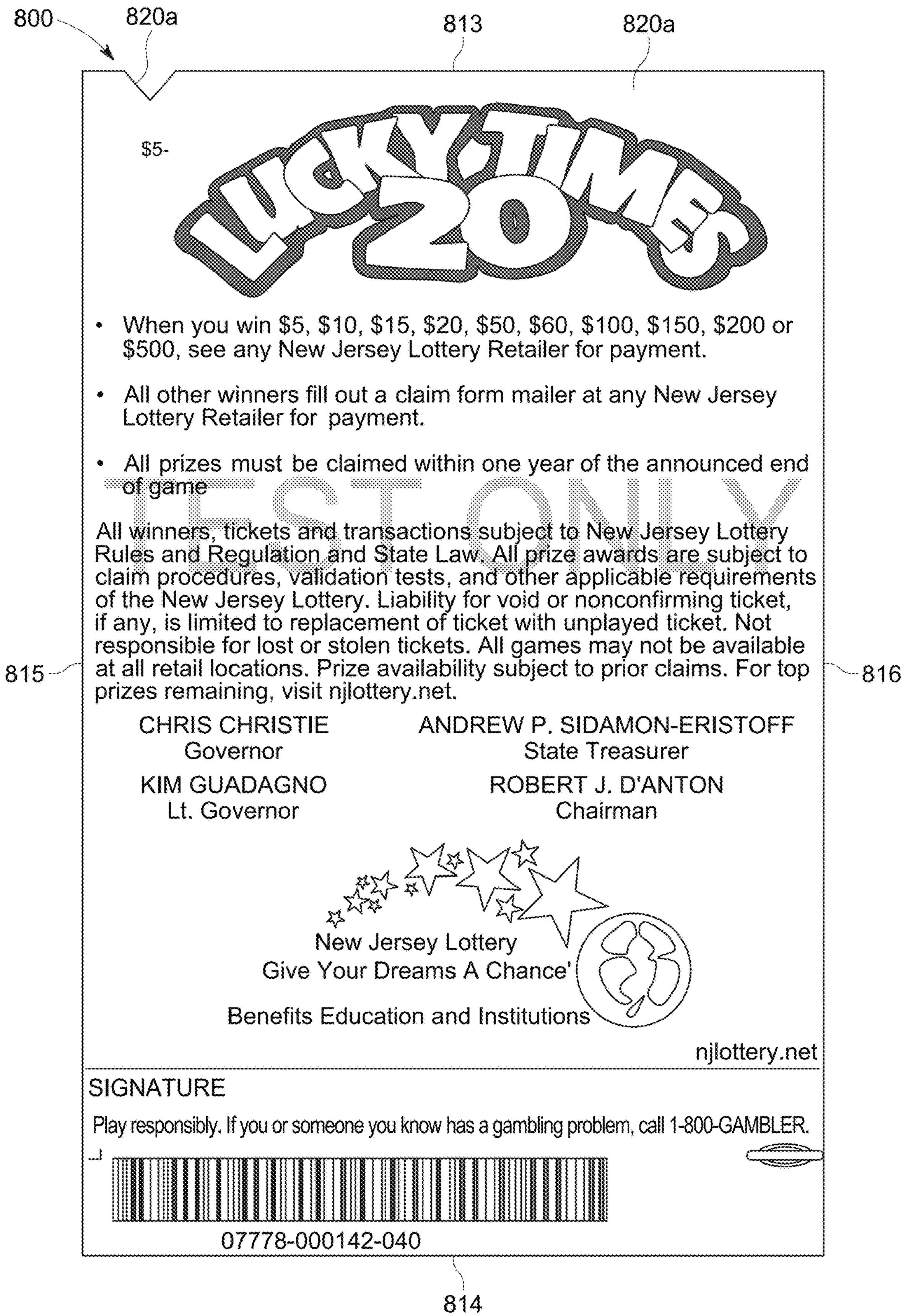
FIG. 11 is an image of the back side of a fourth example lottery ticket having a fourth example burster mark in accordance with the present disclosure.

In various other embodiments, one or more of the burster mark formers 460 and 460*a* of the ticket burster 400*a* form(s) one or more burster marks in the lottery ticket wherein each of the burster mark includes a cut-out of part of the substrate of the lottery ticket that can be subsequently sensed. Examples of such burster marks are shown in FIGS. 10 and 11. In these examples, the cut-out are relatively large for illustrative purposes, but can be of different shapes and sizes (such as smaller).

More specifically, FIG. 10 shows the back surface 710 of the example lottery ticket 700 that includes a burster mark 720*a*. The burster mark 720*a* includes a cut-out in the lottery ticket 700 itself. The cut-out 720*a* includes: (1) a lower edge (not labeled) that is parallel to the end edges 713 and 714 of the lottery ticket 700 and perpendicular to the side edges 715 and 716 of the lottery ticket 700; and (2) a side edge (not labeled) that is perpendicular to the end edges 713 and 714 of the lottery ticket 700 and parallel to the side edges 715 and 716 of the lottery ticket 700. The burster mark 720*a*-which can be formed in one or more or every lottery ticket that that moved into the burster 400*a*-provides an area that can be sensed by the burster mark sensor 430*a* of the burster 400*a* to enable the controller(s) to determine if that lottery ticket is correctly positioned relative to the burster mark sensor 430*a* and thus the burster 400*a*.

It should be appreciated that if the lottery ticket enters the burster 400*a* in an improper position, the burster mark 720*a* would not include: (1) a lower edge that is parallel to the end edges 713 and 714 of the lottery ticket 700 and perpendicular to the side edges 715 and 716 of the lottery ticket 700; and/or (2) a side edge that is perpendicular to the end edges 713 and 714 of the lottery ticket 700 and parallel to the side edges 715 and 716 of the lottery ticket 700. The burster sensor 430*a* would subsequently be able to detect that this burster mark 720*a* is in an improper position that would indicate the improper position of the lottery ticket in the burster.

In another example, FIG. 11 shows the back surface 810 of the example lottery ticket 800 that includes a single burster mark 820*a*. The burster mark 820*a* includes a cut-out in the lottery ticket itself. The cut-out includes angled sides (not labeled). The burster mark 820*a* is formed by the buster mark former in one or more or every lottery ticket as the lottery ticket moves into the burster and provides an area that can be sensed by the burster mark sensor 430*a* of the burster 400*a* to enable the controller(s) to determine if that lottery ticket is correctly positioned relative to the burster mark sensor 430*a* and thus the burster 400*a*.

It should be appreciated that if the lottery ticket enters the burster 400*a* in an improper position, the burster mark 820*a* would not be in an improper position relative to the end edges 813 and 814 of the lottery ticket 800 and to the side edges 815 and 816 of the lottery ticket 800. The burster sensor 430*a* would subsequently be able to detect that this burster mark 820*a* is in an improper position that would indicate the improper position of the lottery ticket in the burster.

Figure 12:
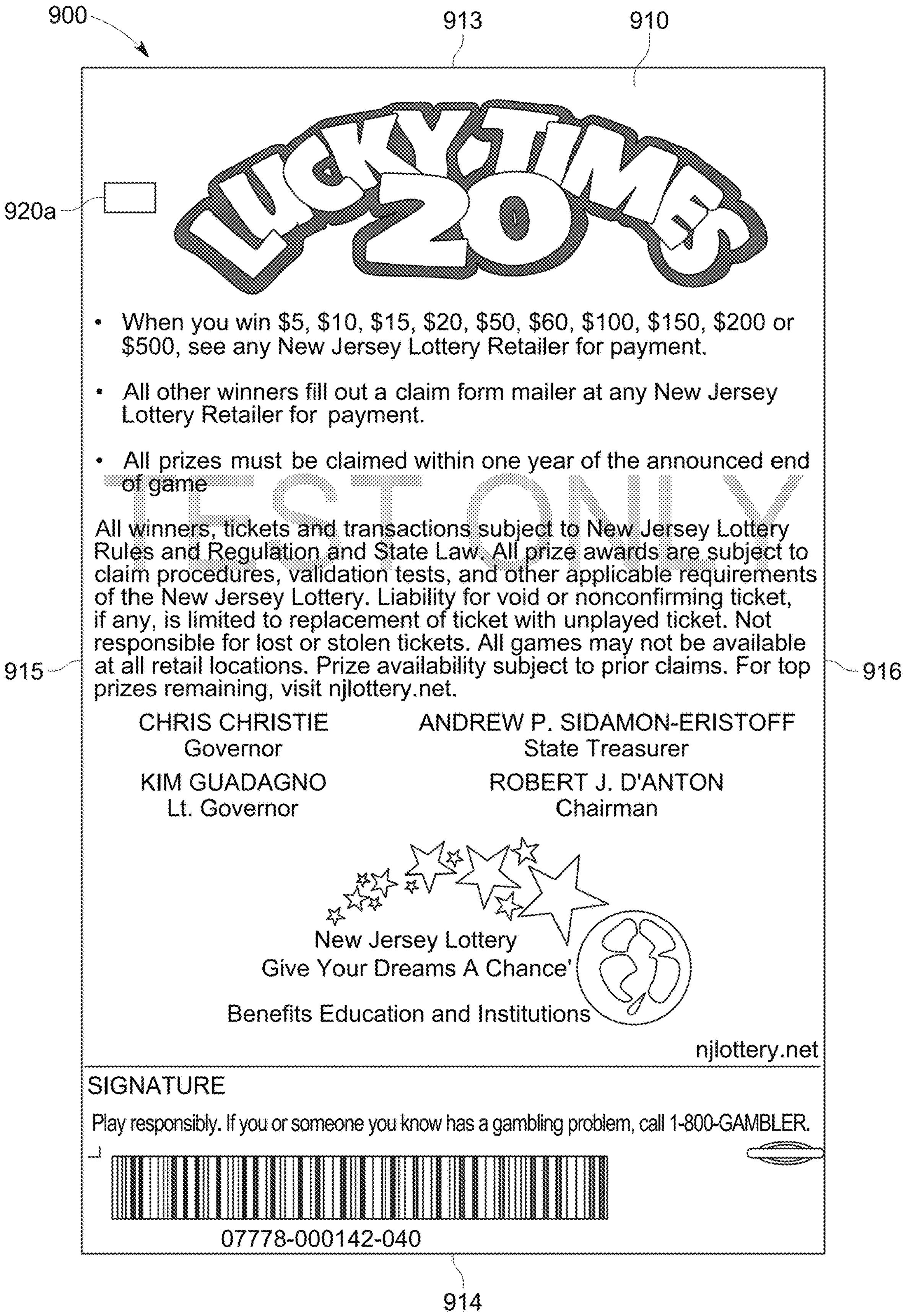
FIG. 12 is an image of the back side of a fifth example lottery ticket having a fifth example burster mark in accordance with the present disclosure.

In another example, FIG. 12 shows the back surface 910 of the example lottery ticket 900 that includes a single burster mark 920*a*. The burster mark 920*a* includes a cut-out in the lottery ticket itself. The cut-out is at a location interior to the end edges 913 and 914 of the lottery ticket 900 and to the side edges 915 and 916 of the lottery ticket 800.

It should be appreciated that if the lottery ticket enters the burster 400*a* in an improper position, the burster mark 920*a* would not be in an improper position relative to the end edges 913 and 914 of the lottery ticket 900 and to the side edges 915 and 916 of the lottery ticket 900. The burster sensor 430*a* would subsequently be able to detect that this burster mark 920*a* is in an improper position that would indicate the improper position of the lottery ticket in the burster.

It should be appreciated that if the burster mark includes a cut-out in the lottery ticket, the cut-out can be formed by one or more of the burster mark formers 460 and 460*a*. In one such example embodiment, the burster mark formers

460 and 460*a* simultaneously work together to create the cut-out in the lottery ticket. In various such embodiments, both burster mark formers 460 and 460*a* include cutting edges (not shown) that meet at the position that the lottery ticket moves into the burster. In various such embodiments, one of the burster mark formers 460 and 460*a* include a cutting edge (not shown) and the other includes a base (not shown) that are configured to meet at the position that the lottery ticket moves into the burster.

Generally, the burster mark sensor 430*a* is configured to detect the one or more burster marks on or in each lottery ticket such as but limited to the example burster marks described above.

For example, if the burster mark is printed on the lottery ticket, when light from an emitter (not shown) of the burster mark sensor 430*a* strikes an area adjacent to a burster mark of the lottery ticket in the ticket burster 400*a*, that section reflects some or all of the light back toward the burster mark sensor 430*a*. When light from an emitter (not shown) of the burster mark sensor 430*a* strikes burster mark, the burster mark absorbs some or all of the light and does not reflect all of the light back toward the burster mark sensor 430*a*. For example, a white area adjacent to a burster mark of the lottery ticket in the ticket burster 400*a* will reflect the light back toward the burster mark sensor 430*a*, and the black area of the burster mark of the lottery ticket will not reflect the light back toward the burster mark sensor 430*a* (i.e., the black area of the burster mark will absorb the light). When the light is reflected back toward the burster mark sensor 430*a*, that reflected light enters a receiver (not shown) of the burster mark sensor 430*a* (where the intensity of light can be increased in needed in certain embodiments).

Figure 13A:
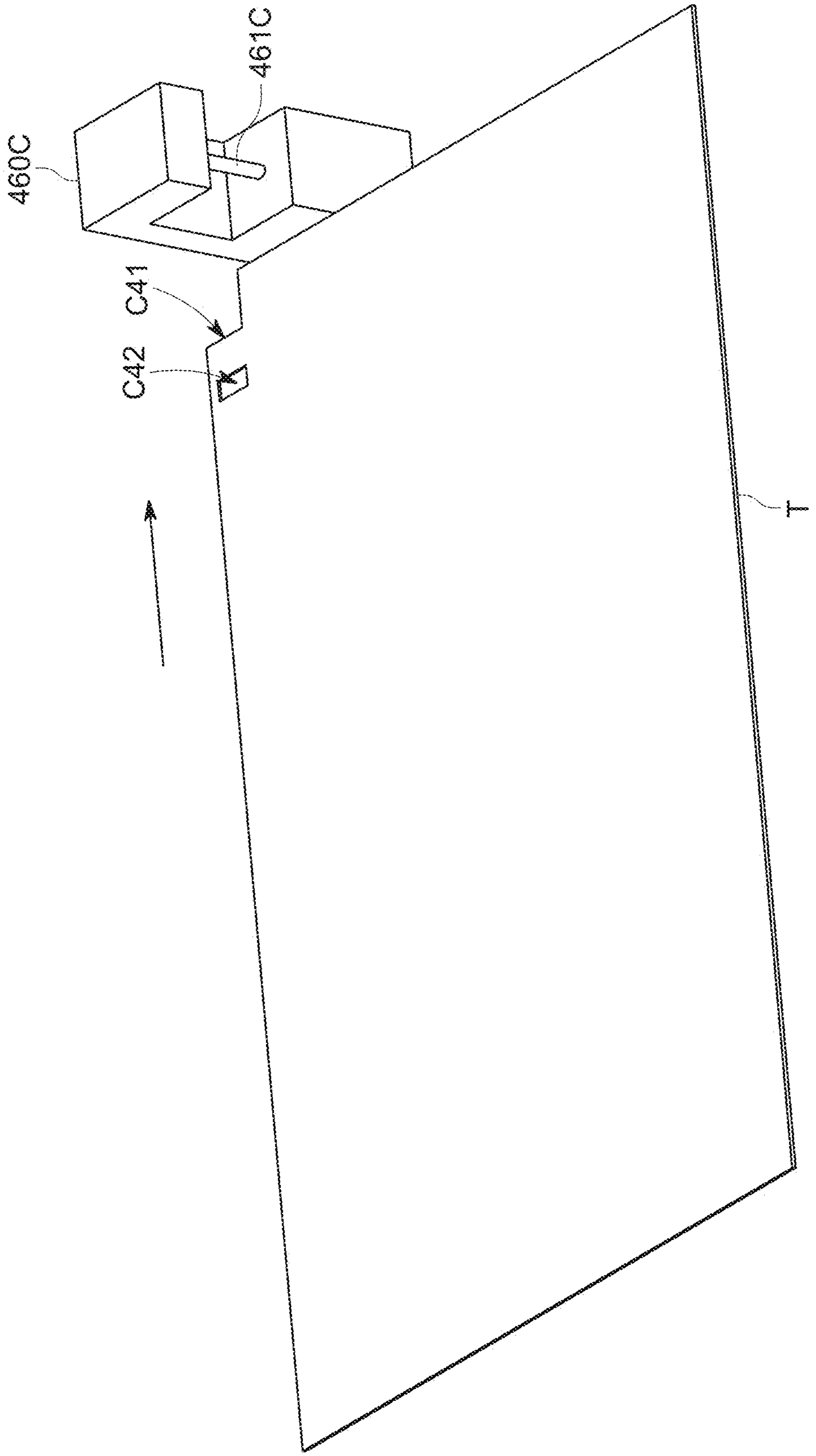
FIGS. 13A, 13B, and 13C are diagrammatic perspective views of a sixth example lottery ticket having sixth example burster marks in accordance with the present disclosure and being scanned by a burster mark sensor in accordance with one example embodiment of the present disclosure.
Figure 13B:
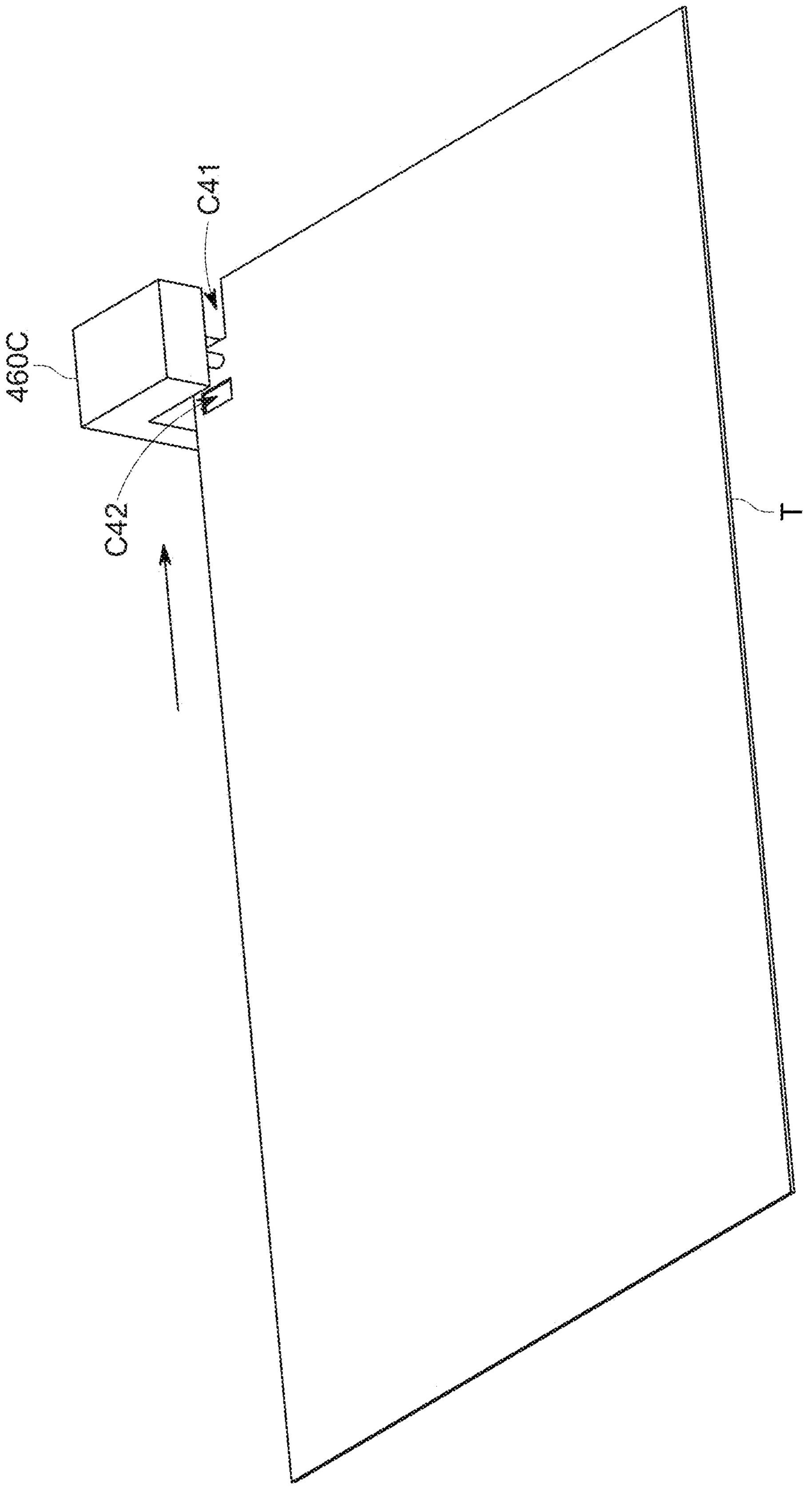
Figure 13C:
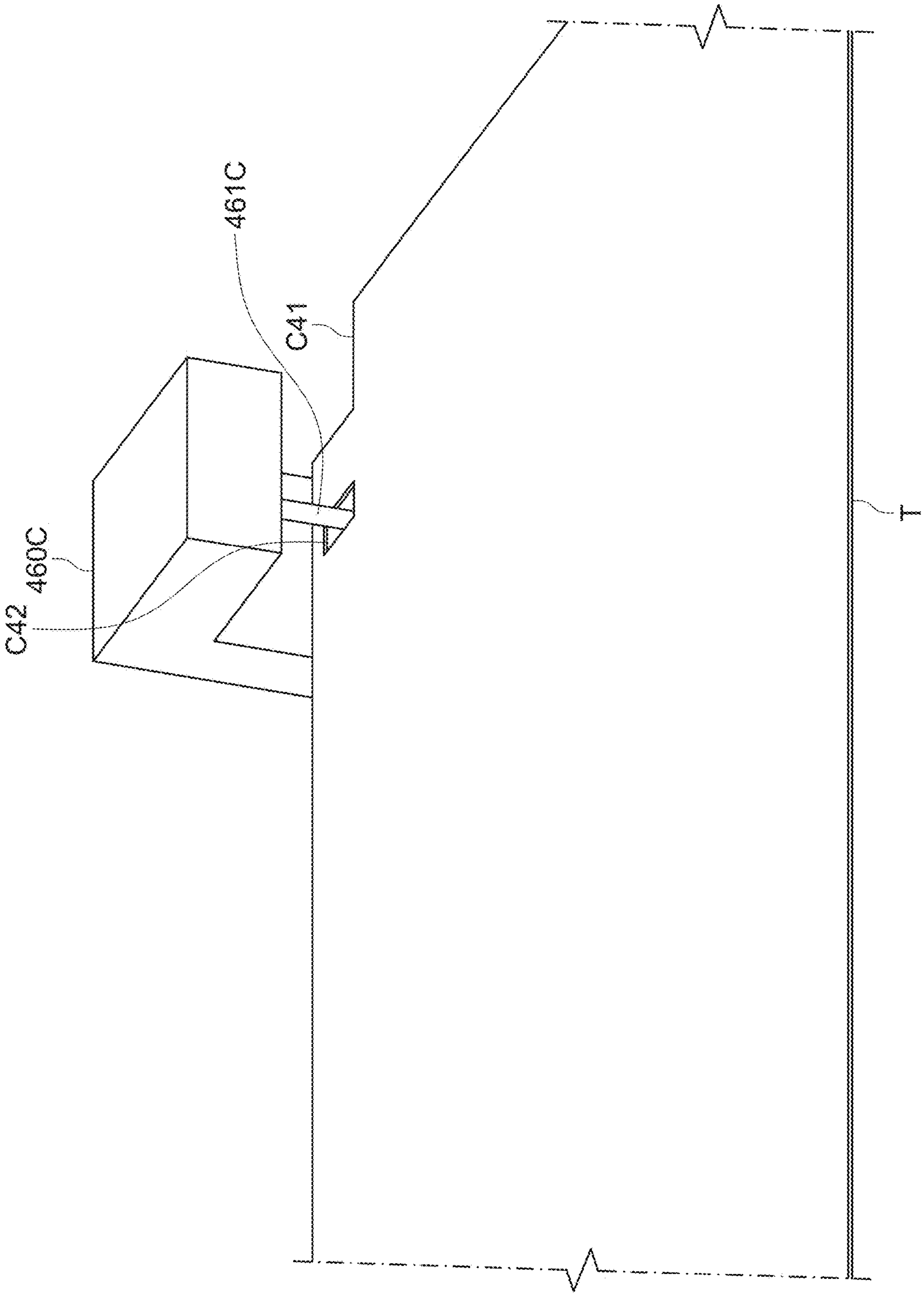

In another example, if the burster mark is a cut-out in the lottery ticket, the ticket burster 400*a* can include a suitable burster mark sensor such as the example optical burster mark sensor 460*c* shown in FIGS. 13A, 13B, and 13C that is configured to sense the cut-out including where the cut-out begins and where the cut-out ends. In this example, for illustrative purposes, the ticket T includes two different example cut-outs, and specifically a first cut-out CU1 and a second cut-out CU2. The optical burster mark sensor 460*c* creates an infrared beam 461*c* and the lottery ticket T is moved through the beam 461*c*. The burster mark sensor 460*c* is configured to create and send signals to the controller(s) of the vending machine either or both of when the beam 461*c* is blocked by the lottery ticket T and/or when the beam is not blocked by the ticket T. When the beam 461*c* extends through either of the cut-outs CU1 or CU2, the beam 461*c* will not be blocked by the lottery ticket T. It should be appreciated from this example that the burster can form one or more cut-outs in the lottery ticket. It should be appreciated that the burster mark sensor for detecting the cut-out can be alternative sensors in accordance with the present disclosure.

In any of these different example embodiments, the respective burster mark sensor creates and sends electrical signals (that can be digital or analog in different embodiments) to one or more of the controllers of the burster and/or the controller of the vending machine. These signals can be on and off type signals or other suitable signals (such as dynamic or continuous signals that vary in voltage (such as 0-10 volts). In certain embodiments, voltage outputs can be sent to the controller(s). In various embodiments, the analog signals can be digitized (by a suitable analog to digital converter) and processed in a digital domain with digital signal processing process before being sent to the controller.

The respective controller(s) receive and interpret these received signals in comparison to comparison data (such as but not limited to an expected pattern of signals described below for the burster marks of the lottery ticket or expected positional data for the lottery ticket). If these received signals do not correspond to or match (or substantially correspond to or match the comparison data), the controller(s) provide(s) determines that the lottery ticket has a positional issues and can take the correction actions and/or send the alerts. In various embodiments, the corrective action and/or the alerts are based on the amount of disparity between these received signals and the comparison data (such as the expected pattern of signals). In various embodiments, the comparison data can be based on data associated with one or more stepper motors that control movement of the lottery ticket as further described below.

The burster mark sensor(s) is/are thus configured to create signals that are used by the controller(s) to determine if each lottery ticket is in the correct expected position as that lottery ticket moves from the ticket drawer into the ticket burster 400*a* and before it reaches the ticket cutter 440*a*.

The burster controller and/or the controller of the ticket vending machine 100 is/are thus configured to determine based on the signals and the comparison data for the lottery ticket whether the lottery ticket is in the correct position in the burster 400*a*.

If the burster controller and/or the controller of the ticket vending machine 100 determines that the position of the lottery ticket is proper, the burster controller and/or the controller of the ticket vending machine 100 does not need to take any corrective actions.

If the burster controller and/or the controller of the ticket vending machine 100 determines that the position of the lottery ticket is improper, the burster controller and/or the controller of the ticket vending machine 100 can take one or more of a series of different corrective actions.

In various different embodiments, the respective corrective action taken in such case can vary and can be any one or more of the following example corrective actions: (1) cause a display of a warning message on a display device of the vending machine 100 to alert an operator of the vending machine 100 regarding the position issue to enable the operator to act on such issue and fix the issue; (2) send a warning message to a remote monitoring device separate from the vending machine regarding the position issue to enable an operator to act on such issue and fix the issue; and/or (3) automatically make an adjustment to one or more of the components of the vending machine 100 to attempt to address the position issue.

In various embodiments, the corrective action can include the controller(s) making one or more automatic adjustments of the cutting system of the ticket burster 400*a*.

In various embodiments, the corrective action can include the controller(s) making one or more automatic adjustments of the positioning of tickets relative to the ticket cutter of the ticket burster 400*a*.

It should be appreciated that by regularly scanning the lottery tickets for positioning issues, the vending machine will be able to catch and cause such issues to be properly addressed before such issues cause lottery tickets that are undesired in look and feel, and/or not redeemable to be dispensed by the ticket vending machine.

It should be appreciated that by regularly scanning the sections of lottery tickets that include the burster marks, the vending machine 100 can determine or verify that lottery ticket dispensing process is properly calibrated, operating, and functioning within pre-defined specifications.

It should also be appreciated that various embodiments of the present disclosure provide that the burster marks can be used to either fully locate the beginning or end of the lottery ticket for the dispensing process. These burster marks can be used to validate that the lottery ticket position is within acceptable margins or can be used to more properly index the lottery tickets and the perforation locations thereof for cutting. In certain embodiments, the burster marks can be compared or indexed relative comparison data including a step count of one or more stepper motors of the burster for this indexing. The controller(s) can compare the locations of the burster mark(s) on based on the signals to comparison data regarding the number of steps of the stepper motor to determined positions and any trend of changing positions. If such trending indicates potential lottery ticket misalignment, the controller can perform an arithmetic calibration on the next lottery ticket being dispensed or as a separate operation wherein the lottery ticket is moved out of the ticket drawer by the stepper motor and returned to validate the burster marks are within acceptable margins. If the problem is not resolved, the vending machine can either locally and/or remotely flag the ticket drawer as having a non-recoverable problem and provide any suitable alerts. In other words, in certain embodiments, the vending machine using the burster mark sensor creates a type of signature (in the form of the signals) for that lottery game that can be used to validate the physical registration of that lottery ticket relative to the steps of a stepper motor (not shown) that is dispensing the lottery ticket. If the registration of that lottery ticket become mismatched with the number of steps within a certain margin, the registration can be recalibrated to prevent miscutting of the lottery ticket.

The present disclosure further contemplates that the controller(s) can determine the comparison data (such as the expected pattern of signals) for the burster mark(s) of each lottery ticket in any suitable manner such as but not limited to one of the plurality of different example manners described below.

In one example manner, the controller(s) are configured to receive the comparison data such as the expected pattern of signals for the burster mark(s) of each lottery ticket from a remote source such as a central lottery system. In various such embodiments, the central lottery system can send the expected pattern of signals for the burster mark(s) of each lottery ticket to the vending machine when one or more packs are shipped to the location of the vending machine. In various such embodiments, the central lottery system can send the expected pattern of signals for the burster mark(s) of each lottery ticket to the vending machine responsive to a request from the vending machine to activate the pack or a ticket of the pack.

In another example manner, the controller(s) are configured to receive the comparison data such as the expected pattern of signals for the burster mark(s) of each lottery ticket from a local source such from a memory device communicatively connected to the vending machine 100.

In another example manner, the controller(s) are configured to create or determine the comparison data such as the expected pattern of signals for the burster mark(s) of each lottery ticket during a pack loading procedure that the vending machine 100 performs when the pack is loaded into a ticket drawer of the vending machine.

In another example manner, the controller(s) are configured to create or determine the comparison data for the burster mark(s) of each lottery ticket based on predefined information regarding the distances of the burster marks from the leading edge of the lottery ticket and data for one or more stepper motors based on movement of the lottery ticket caused by such stepper motors.

In another example manner, the controller(s) are configured to create or determine the comparison data for the burster mark(s) of each lottery ticket based on the instructions provided to the burster mark formers 460 and/or 460*a* for the creation of the burster mark(s) on or in the lottery ticket. In other words, the controllers create comparison data based on their own instructions to the burster mark formers.

In various embodiments, the controller(s) of the ticket vending machine can receive or determine and maintain data regarding the length of each lottery ticket from its respective burster mark(s) to both the leading edge, so the controller knows when to detect the burster mark(s) of the lottery tickets, or when to pay attention to the signals received from the burster mark sensor.

In various embodiments, since the ticket vending machine 100 is regularly monitoring the burster mark(s) on or in the dispensed lottery tickets, the ticket vending machine 100 will often be able to detect a positioning problem before the problem becomes severe enough to cause the ticket vending machine to shut down and stop dispensing lottery tickets. In various embodiments, when the ticket vending machine 100 detects a position problem that is severe, the controller(s) can cause the ticket vending machine to shut down and stop dispensing lottery tickets.

In various embodiments, the burster mark sensor includes a plurality of adjacent burster mark sensors.

It should be appreciated from the above that various embodiments of the present disclosure provide lottery ticket vending machine comprising: a housing; a ticket drawer column in the housing, the ticket drawer column comprising a plurality of ticket drawers, each of the ticket drawers configured to hold a strip of lottery tickets; a ticket burster in the housing, the ticket burster: (a) defining a ticket inlet and a ticket outlet, (b) movable to a plurality of different ticket receipt positions, each different ticket receipt position associated with and in alignment with a different one of the ticket drawers, (c) comprising a burster-mark former configured to form a burster mark in the lottery ticket that moves through the ticket burster, and (d) comprising a burster mark sensor supported by the ticket burster and configured to create signals based on the burster mark in the lottery ticket; and a controller configured to receive signals created by the burster mark sensor, determine if the lottery ticket is improperly positioned based on the signals, and cause a corrective action to be taken responsive to determining that the lottery ticket is improperly positioned. In various such embodiments, the burster mark is a cut-out in the lottery ticket. In various such embodiments, the burster mark sensor is configured to create the signals based on the cut-out in the lottery ticket. In various such embodiments, the controller is configured to determine if the lottery ticket has is improperly positioned based on a comparison of the signals and comparison data. In various such embodiments, the controller is configured to receive the comparison data. In various such embodiments, the controller is configured to create the comparison data. In various such embodiments, the lottery ticket vending machine comprises a display device and wherein the corrective action comprises causing a display by the display device of an indication of a ticket position issue. In various such embodiments, the corrective action comprises sending a message to a remote monitoring device separate from the vending machine regarding an indication of a ticket position issue. In various such embodiments, the ticket burster comprises two spaced-apart opposing burster-mark formers configured to form the burster mark in the lottery ticket that moves through the ticket burster. In various such embodiments, the burster mark is a cut-out in the lottery ticket.

It should further be appreciated from the above that various embodiments of the present disclosure provide a lottery ticket vending machine comprising: a housing; a ticket drawer column in the housing, the ticket drawer column comprising a plurality of ticket drawers, each of the ticket drawers configured to hold a strip of lottery tickets; a ticket burster in the housing, the ticket burster: (a) defining a ticket inlet and a ticket outlet, (b) movable to a plurality of different ticket receipt positions, each different ticket receipt position associated with and in alignment with a different one of the ticket drawers, (c) comprising a burster-mark former configured to form a burster mark on the lottery ticket that moves through the ticket burster, and (d) comprising a burster mark sensor supported by the ticket burster and configured to create signals based on the burster mark on the lottery ticket; and a controller configured to receive signals created by the burster mark sensor, determine if the lottery ticket is improperly positioned based on the signals, and cause a corrective action to be taken responsive to determining that the lottery ticket is improperly positioned. In various such embodiments, the burster mark is printed on the lottery ticket. In various such embodiments, the burster mark sensor is configured to create the signals based on the burster mark printed on the lottery ticket. In various such embodiments, the controller is configured to determine if the lottery ticket has is improperly positioned based on a comparison of the signals and comparison data. In various such embodiments, the controller is configured to receive the comparison data. In various such embodiments, the controller is configured to create the comparison data. In various such embodiments, the lottery ticket vending machine comprises a display device and wherein the corrective action comprises causing a display by the display device of an indication of a ticket position issue. In various such embodiments, the corrective action comprises sending a message to a remote monitoring device separate from the vending machine regarding an indication of a ticket position issue.

It should further be appreciated from the above that various embodiments of the present disclosure provide a lottery ticket vending machine comprising: a housing; a lottery ticket drawer supported by the housing; a ticket burster supported by the housing and comprising a burster mark former and a burster mark sensor; and a controller supported by the housing, the controller configured to operate with the burster mark former to form a burster mark in or on a lottery ticket and to operate with the burster mark sensor to determine if the lottery ticket is fed in to the ticket burster in a proper position to enable the ticket burster to properly separate lottery ticket received from the ticket drawer based on the burster mark, and to cause a corrective action to be taken responsive to determining that the ticket burster is improperly separating the lottery tickets. In various such embodiments, the burster mark is one of printed on the lottery ticket and a cut-out in the lottery ticket.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The claims are as follows:

1. A lottery ticket vending machine comprising:
- a housing;
- a ticket drawer column in the housing, the ticket drawer column comprising a plurality of ticket drawers, each of the ticket drawers configured to hold a strip of lottery tickets;
- a ticket burster in the housing, the ticket burster:
  - (a) defining a ticket inlet and a ticket outlet,
  - (b) movable to a plurality of different ticket receipt positions, each different ticket receipt position associated with and in alignment with a different one of the ticket drawers,
  - (c) comprising a burster-mark former configured to form a burster mark in the lottery ticket that moves through the ticket burster, and
  - (d) comprising a burster mark sensor supported by the ticket burster and configured to create signals based on the burster mark in the lottery ticket; and
- a controller configured to receive signals created by the burster mark sensor, determine if the lottery ticket is improperly positioned based on the signals, and cause a corrective action to be taken responsive to determining that the lottery ticket is improperly positioned.

2. The lottery ticket vending machine of claim 1, wherein the burster mark is a cut-out in the lottery ticket.

3. The lottery ticket vending machine of claim 2, wherein the burster mark sensor is configured to create the signals based on the cut-out in the lottery ticket.

4. The lottery ticket vending machine of claim 1, wherein the controller is configured to determine if the lottery ticket is improperly positioned based on a comparison of the signals and comparison data.

5. The lottery ticket vending machine of claim 4, wherein the controller is configured to receive the comparison data.

6. The lottery ticket vending machine of claim 4, wherein the controller is configured to create the comparison data.

7. The lottery ticket vending machine of claim 1, which comprises a display device and wherein the corrective action comprises causing a display by the display device of an indication of a ticket position issue.

8. The lottery ticket vending machine of claim 1, wherein the corrective action comprises sending a message to a remote monitoring device separate from the vending machine regarding an indication of a ticket position issue.

9. The lottery ticket vending machine of claim 1, wherein the ticket burster comprises two spaced-apart opposing burster-mark formers configured to form the burster mark in the lottery ticket that moves through the ticket burster.

10. The lottery ticket vending machine of claim 9, wherein the burster mark is a cut-out in the lottery ticket.

11. A lottery ticket vending machine comprising:
- a housing;
- a ticket drawer column in the housing, the ticket drawer column comprising a plurality of ticket drawers, each of the ticket drawers configured to hold a strip of lottery tickets;
- a ticket burster in the housing, the ticket burster:
  - (a) defining a ticket inlet and a ticket outlet,
  - (b) movable to a plurality of different ticket receipt positions, each different ticket receipt position associated with and in alignment with a different one of the ticket drawers,
  - (c) comprising a burster-mark former configured to form a burster mark on the lottery ticket that moves through the ticket burster, and (d) comprising a burster mark sensor supported by the ticket burster and configured to create signals based on the burster mark on the lottery ticket; and a controller configured to receive signals created by the burster mark sensor, determine if the lottery ticket is improperly positioned based on the signals, and cause a corrective action to be taken responsive to determining that the lottery ticket is improperly positioned.

12. The lottery ticket vending machine of claim 11, wherein the burster mark is printed on the lottery ticket.

13. The lottery ticket vending machine of claim 12, wherein the burster mark sensor is configured to create the signals based on the burster mark printed on the lottery ticket.

14. The lottery ticket vending machine of claim 11, wherein the controller is configured to determine if the lottery ticket is improperly positioned based on a comparison of the signals and comparison data.

15. The lottery ticket vending machine of claim 14, wherein the controller is configured to receive the comparison data.

16. The lottery ticket vending machine of claim 14, wherein the controller is configured to create the comparison data.

17. The lottery ticket vending machine of claim 11, which comprises a display device and wherein the corrective action comprises causing a display by the display device of an indication of a ticket position issue.

18. The lottery ticket vending machine of claim 11, wherein the corrective action comprises sending a message to a remote monitoring device separate from the vending machine regarding an indication of a ticket position issue.

19. A lottery ticket vending machine comprising:

a housing;

a lottery ticket drawer supported by the housing and configured to hold lottery tickets;

a ticket burster supported by the housing and comprising a burster mark former and a burster mark sensor; and a controller supported by the housing, the controller configured to operate with the burster mark former to form a burster mark in or on one of the lottery tickets and to operate with the burster mark sensor to determine if said lottery ticket is fed in to the ticket burster in a proper position to enable the ticket burster to properly separate said lottery ticket from another one of the lottery tickets received from the ticket drawer based on the burster mark, and to cause a corrective action to be taken responsive to determining that the ticket burster is improperly separating the lottery tickets.

20. The lottery ticket vending machine of claim 19, wherein the burster mark is one of printed on the lottery ticket and a cut-out in the lottery ticket.

* * * * *